United States Patent

[11] 3,619,025

| [72] | Inventor | William James Hannan<br>Pennington, N.J. |
|---|---|---|
| [21] | Appl. No. | 862,272 |
| [22] | Filed | Sept. 30, 1969 |
| [45] | Patented | Nov. 9, 1971 |
| [73] | Assignee | RCA Corporation |

[54] ELIMINATION OF THE EFFECTS OF SCRATCHES AND TWISTING IN A HOLOGRAPHIC MOTION PICTURE TAPE
11 Claims, 9 Drawing Figs.

[52] U.S. Cl.................... 350/3.5, 352/85
[51] Int. Cl. .................... G03b 27/00
[50] Field of Search............ 350/3.5, 162 SF; 264/1, 85 H, 85 L

[56] References Cited
UNITED STATES PATENTS
| 3,265,776 | 8/1966 | Henkes | 264/1 |
| 3,314,052 | 11/1967 | Lohmann | 350/162 |

FOREIGN PATENTS
| 1,139,955 | 1/1969 | Great Britain | 350/3.5 |

*Primary Examiner*—David Schonberg
*Assistant Examiner*—Ronald J. Stern
*Attorney*—Edward J. Norton ABSTRACT: Longitudinal streak in playback of pressed phase hologram motion pictures on plastic tape, due to diffraction by longitudinal scratches on the plastic tape, which is normally superimposed on reconstructed image, is eliminated by recording phase hologram with object beam oblique to surface of recording medium. This displaces the streak from the area of the reconstructed image.

Angle of incidence of readout beam is optimized to produce minimum shift in the axis of the image beam in response to any twisting of flexible tape.

PLAYBACK TECHNIQUE (PRIOR ART RECORDING TECHNIQUE)

(PRIOR ART PLAYBACK TECHNIQUE)

INVENTOR.
William J. Hannan
BY George J. Seligsohn
ATTORNEY

PLAYBACK TECHNIQUE

RECORDING TECHNIQUE

INVENTOR.
William J. Hannan
BY George J. Seligsohn
ATTORNEY

ELIMINATION OF THE EFFECTS OF SCRATCHES AND TWISTING IN A HOLOGRAPHIC MOTION PICTURE TAPE

This invention relates to a system employing phase holograms and, more particularly, to such a system wherein the phase holograms are embossed on a thin plastic tape.

Reference is made to the copending Gerritsen et al. U.S. Pat. application, Ser. No. 509,100, entitled "Hologram Record Pressing," filed Nov. 22, 1965, which discloses the idea of making duplicate record pressings of phase holograms from a master record, in a manner similar to that employed for making phonograph record pressings. As is further disclosed in U.S. Pat. application, Ser. No. 509,100, the information contained in the phase holograms of a duplicate record pressing may be a motion picture which can be played back over a home television receiver.

In the preferred embodiments disclosed in the aforesaid U.S. Pat. application, Ser. No. 509,100, the duplicate record pressing is in the form of a disk similar to a phonograph record on which the series of microholograms (each of which covers an area of no more than 10 square millimeters) are arranged in a spiral format. Since that time, it has been found that there are advantages in replacing this disk with a thin transparent plastic tape, such as a strip of vinyl tape having a thickness of about two mills and a width of between 0.25 and 0.5 inches. In this case, the series of phase holograms are longitudinally disposed along the tape and the tape may, if desired, also include a sound track which is either disposed near one edge of the tape parallel to the series of phase holograms or included with the picture information in the form of multiple image holograms. The advantages of a tape over the previously employed disk include the large saving in the amount of plastic material required for any given number of holograms, the fact that the tape lends itself to being stored compactly in a roll, on a reel, or in a cartridge, it permits a simple continuously moving tape transport mechanism to be employed during playback, and it simplifies the sound playback equipment.

The fact that a tape of the type discussed above is relatively soft and flexible, and is not relatively rigid as is a disk, produces certain problems during playback. In particular, the relatively soft back surface of the transparent tape is particularly susceptible to being scratched by the tape transport. These scratches, which are nearly all oriented in the longitudinal direction of the tape, introduce noise during readout of the holograms embossed on the tape by means of a readout beam of light. The scratches diffract the readout beam, causing a streak to appear across the reconstructed image of the hologram beam being readout. This noise streak is very prominent because all longitudinal scratches illuminated by the readout beam contribute to the same streak in the image. The same thing is true for longitudinal scratches on reflective tape.

In general, the reconstructed image is not significantly degraded by bends, wrinkles, dimples, etc., in the thin, flexible tape. However, any twisting of the flexible tape with respect to the readout beam, which changes the angle of incidence of the readout beam with respect to the tape, alters the angle of the first order diffraction, which results in undesired movement in the position of the reconstructed image of the hologram. The present invention is concerned with respective solutions to both these above-discussed problems.

In accordance with one feature of the present invention, it has been found that it is possible to orient an object, such as a transparency, and a reference beam with respect to the hologram recording medium at the time the hologram is originally recorded in a manner such that when a duplicate phase hologram, embossed on a plastic tape having scratches thereon, is read out, the location of the reconstructed image will be spatially separated from the location of the diffraction-formed light streak caused by the scratches, rather than being superimposed thereon.

In accordance with another feature of the present invention, the angle of incidence of the readout beam with respect to a tape may be chosen in a manner such as to minimize the change in the position of the reconstructed image with any twisting of the tape with respect to the readout beam (which changes the angle of incidence of the readout beam with respect to the tape).

It is therefore an object of the present invention to provide an improved holographic system compatible with a phase hologram recording pressing made of thin, flexible, relatively soft plastic tape.

This and other objects, features, and advantages of the present invention will become more apparent from the following detailed description taken together with the accompanying drawing, in which.

Figure 1:
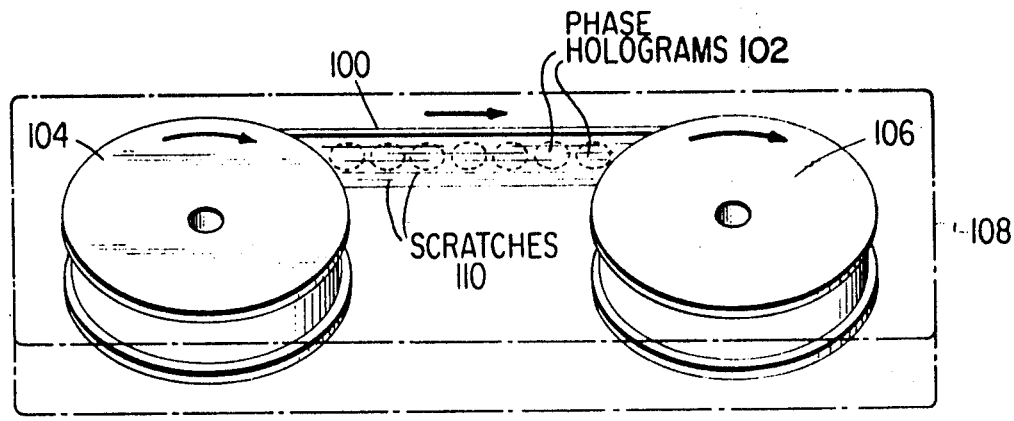
FIG. 1 is a diagrammatic showing of a strip of a thin transparent plastic tape, of the type with which the present invention is concerned, having a series of phase holograms disposed along the tape, and a housing therefor.

Referring now to FIG. 1, a roll of thin, transparent plastic tape 100, which may be composed of vinyl having a thickness about 2–4 mills and a width about ¼–½ inch, has a series of phase holograms 102 pressed into the far side of transparent tape 100, as shown. The tape may be wound around reels 104 and 106, all of which may be housed in cartridge 108. Transparent tape 100 may be moved continuously from reel 104 to reel 106 by means which are not shown and which do not form any part of the present invention. However, since the transparent plastic tape is a relatively soft material, it is particularly subject to being scratched. As a matter of fact, in the process of being moved from reel 104 to 106 a plurality of undesirable longitudinal scratches 110 are produced on both sides of tape 100, but particularly on the rear side of tape 100.

Although not shown in FIG. 1, openings are provided in cartridge 108 to permit unimpeded passage of a readout beam into cartridge 108, through transparent tape 100 and out of cartridge 108. The readout beam is oriented in cooperative relationship with transparent tape 100 so as to sequentially illuminate each of the series of phase holograms 102 in succession as they pass by the readout beam.

Figure 2:
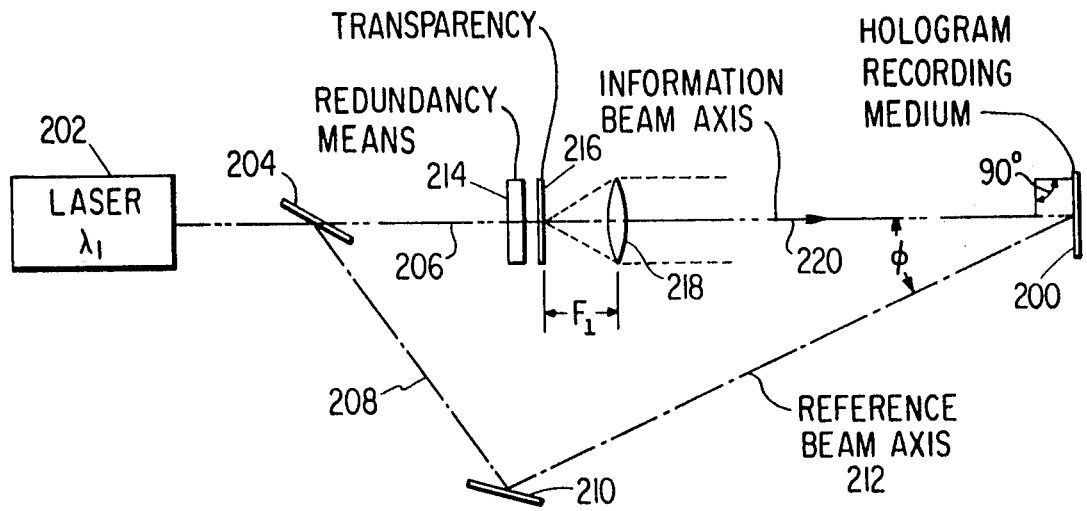
FIG. 2 shows a prior art recording technique for recording a hologram on a hologram recording medium corresponding to spatial information on a transparency.

Referring now to FIG. 2, hologram recording medium 200, which may be in the form of a length of tape coated with a photoresist with the length of the tape extending in the direction perpendicular to the plane of the paper, is oriented such that its plane is perpendicular to the axis of the object beam.

Laser 202 emits a beam of optical energy of a first given wavelength $\lambda_1$. Partially reflecting mirror 204, called a beam splitter, divides the laser output beam into two component beams 206 and 208. Beam 208, after reflection from mirror 210, forms a reference beam directed along reference beam axis 212 which impinges upon hologram recording medium 200. Beam 206 is passed through redundancy means 214, which may be a diffuser or, preferably, a phase grating of the type disclosed in the copending U.S. Pat. application, Ser. No. 662,882, filed Aug. 23, 1967. The optical energy emerging from redundency means 214 illuminates transparency 216 having a spatial pattern of information thereon. If a Fresnel hologram is to be made, convex lens 218 may be omitted and the optical energy emerging from transparency 216 may be applied directly to hologram recording medium 200. However, if a Fraunhofer hologram is to be made, lens 218 is disposed in front of transparency 216 at a distance equal to the focal length of lens 218 so that transparency 216 lies in the focal plane of lens 218. In this case, the output of optical energy from lens 218 is applied as the information beam about information beam axis 220 to hologram recording medium 200. As shown, information beam axis 200 is displaced from reference beam axis 212 by a displacement angle $\theta$.

What is important in FIG. 2, is that in the prior art recording technique hologram recording medium 200 is oriented parallel to transparency 216 and, consequently, information beam axis 220 is oriented substantially orthogonal to the surface of hologram recording medium 220.

Figure 3:
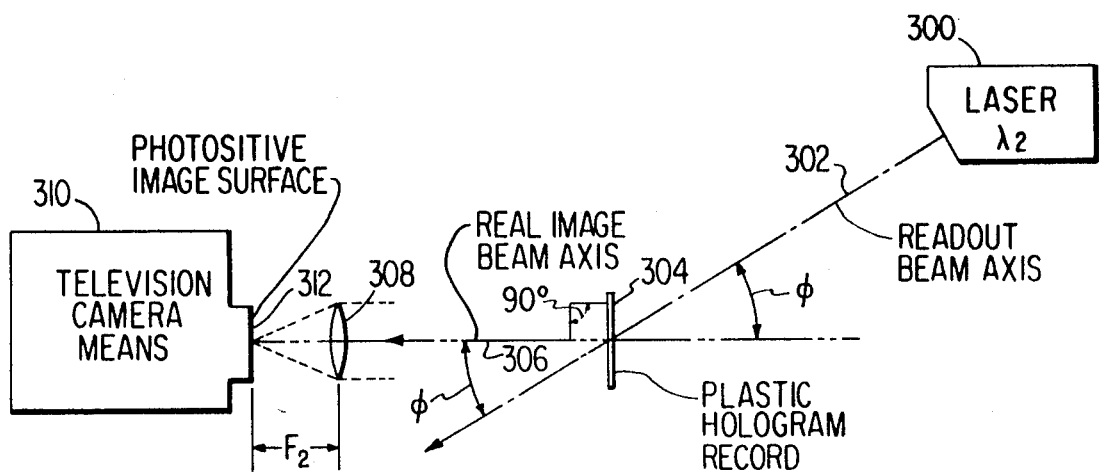
FIG. 3 shows a prior art playback technique for reconstructing an image of the spatial information corresponding to a phase hologram on the photosensitive imaging surface of television camera means.

Referring now to FIG. 3, laser 300 produces a readout beam of optical energy disposed about readout beam axis 302 at a second given wavelength $\lambda_2$ which may be the same or different from the first given wavelength $\lambda_1$ at which the phase holograms being read out were recorded. The readout beam impinges upon plastic hologram record 304, which is physically identical to tape 100. The phase holograms of record 304 were originally recorded on a master recording, from which plastic hologram record 304 was derived, by the recording technique of FIG. 2. The readout beam impinges upon plastic hologram record 304 at an angle of incidence with respect to the normal to the surface of plastic hologram record 304. This angle of incidence between readout beam axis 302 and the normal to plastic hologram record 304 is designated $\Phi$.

At some certain value of the angle of incidence $\Phi$, which depends on the wavelength $\lambda_1$ of the optical energy used in recording the phase hologram, the value of the displacement angle $\theta$ (shown in FIG. 2) and the wavelength $\lambda_2$ of the readout beam 302, the real image beam axis 306 can always be made perpendicular to the surface of plastic hologram record 304. In the special case where the same wavelength is used in recording the phase hologram and reading out the phase hologram, this certain value of the angle of incidence $\Phi$ is just equal to the displacement angle $\theta$ between the reference and information beam axes employed recording the hologram.

The image beam disposed about image beam axis 306 emerging from plastic hologram record 304 in response to the illumination thereof by the readout beam 302 from laser 300 will inherently focus into a real image at a given distance from record 304 if recorded phase hologram is a Fresnel hologram, and in this case convex lens 308 may be omitted and television camera means 310 is oriented with its photosensitive imaging surface 312 coincident with the real image. However, if the recorded phase hologram is a Fraunhofer hologram, it is necessary to insert lens 308 in the path of the image beam and then locate photosensitive imaging surface 312 in the focal plane of lens 308 to form a reconstructed real image of the information recorded in the phase hologram of plastic hologram record 304 on photosensitive imaging surface 312.

As stated earlier, plastic hologram record 304 not only contains the desired phase holograms to be read out, but also contains undesired longitudinal scratches. These longitudinal scratches diffract the readout beam in a direction perpendicular to the scratches, causing a bright streak of optical energy to emerge from plastic hologram record 304 in response to being illuminated by the readout beam, which streak of optical energy is directed in an orthogonal direction with respect to plastic hologram record 304, i.e., the same direction as image beam axis 306. This streak of light, therefore, also impinges upon imaging surface 312. The result, as shown in FIG. 3a, is that the reconstructed image 314 has a light streak 316 superimposed thereon, which is highly undesirable.

So far in this discussion, no account has been taken of the fact that plastic hologram record 304 is flexible, and is, therefore, capable of twisting or rotating by a certain amount in a direction perpendicular to the length thereof. The effect of such twisting or rotating is analyzed in the diagram shown in FIG. 3b. In this discussion, as well as the following discussion of FIG. 5b, the angle of incidence, designated $\Phi$ is defined as the angle between the readout beam and a normal to the surface of plastic hologram record 304. FIG. 3 shows plastic hologram record 304 in a nominally correct position designated $P_1$ and in a twisted position designated $P_2$. The direction of readout beam axis 302 is designated by the line segment A–B. The normal to tape 304 when in its nominal position $P_1$ is designated by the line segment C–D; the normal to tape 304 when in its twisted position $P_2$ is designated by the line segment E–F. The intersection of the various line segments is designated by O. The first order diffraction angle, designated $\alpha$ is defined herein as the angle between the image beam emerging from plastic hologram record 304 and the normal to plastic hologram record 304 regardless of the particular rotational position then occupied by record 304. $\alpha_0$ is the particular value of the first order diffraction angle $\alpha$ when second 304 has its nominal position $P_1$. $d\Phi$ designates the incremental change in the angle of incidence of the readout beam, as record 304 twists. $d\alpha$ designates incremental change in $\alpha$ due to the incremental change in the angle of incidence $d\Phi$ of the readout beam. $d\alpha_0$ designates the incremental change in the angular direction of the image beam from its nominal direction 306, when record 304 is in its nominal position $P_1$, due to the change $d\Phi$ in the angle of incidence of the readout beam when tape 304 twists to a position such as position $P_2$.

In FIG. 3, the nominal image beam axis 306 is normal to hologram record 304 when in its nominal position $P_1$. Therefore, in this case, the first order diffraction angle $\alpha_0$ is zero. Any twisting of plastic hologram record 304 from its nominal position $P_1$ to position $P_2$ will change the normal thereto from line segment C–D to line segment E–F, thereby adding the increment $d\Phi$ to the angle of incidence of readout beam 302. Also, the direction of the image beam axis will change from direction O–C to O–H, so that it is no longer normal to the twisted position $P_2$ of hologram record 304. The result is that the first order diffraction angle (measured with respect to the then-existing normal E–F to the surface of record 304) is changed from zero to a value $-d\alpha$, while the actual direction of the axis of image beam O–H, when the plastic hologram record 304 is in twisted position $P_2$, is angularly displaced by an amount $d\alpha_0$ from its nominal position along line O–C. This change in the direction of the image beam causes a mis-registration of the image on photosensitive imaging surface 312 which is a function of both the amount of twisting or the change in the angle of incidence $d\Phi$ and the functional relationship between $d\alpha_0$ and $d\Phi$. For a given tolerance tape transport, nothing can be done about the maximum twist $d\Phi$. However, it is possible to minimize the change in $d\alpha_0$ with respect to any given change in the angle of incidence $d\Phi$.

Figure 4:
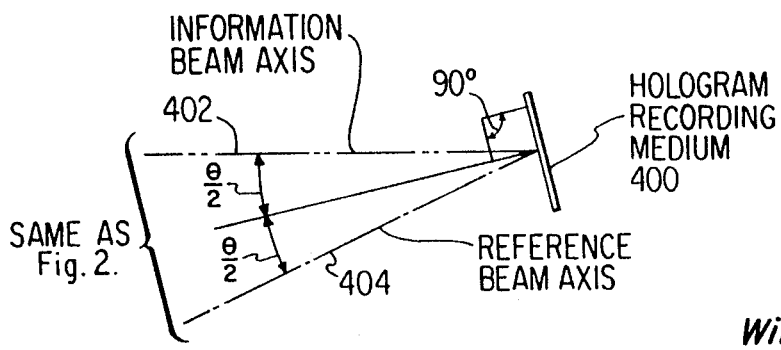
FIG. 4 shows a modification of FIG. 2 which illustrates the recording technique of the present invention.

Referring now to FIG. 4, which discloses the recording technique of the present invention, it will be seen that the only difference between this new technique and the prior art technique shown in FIG. 2 is that hologram recording medium 400 in FIG. 4 is oriented so that the line normal to the surface thereof bisects the displacement angle $\theta$ between information beam axis 402 and reference beam axis 404, rather than the information beam axis lying on the normal to the hologram recording medium as is the case in FIG. 2. In all other respects, recording technique in FIG. 4 is identical to that of FIG. 2. Actually, although the arrangement shown in FIG. 4 is considered the preferred embodiment of the recording technique in the present invention, the invention contemplates all recording techniques wherein the information beam axis 402 is oblique with respect to the normal to hologram recording medium 400.

Figure 5:
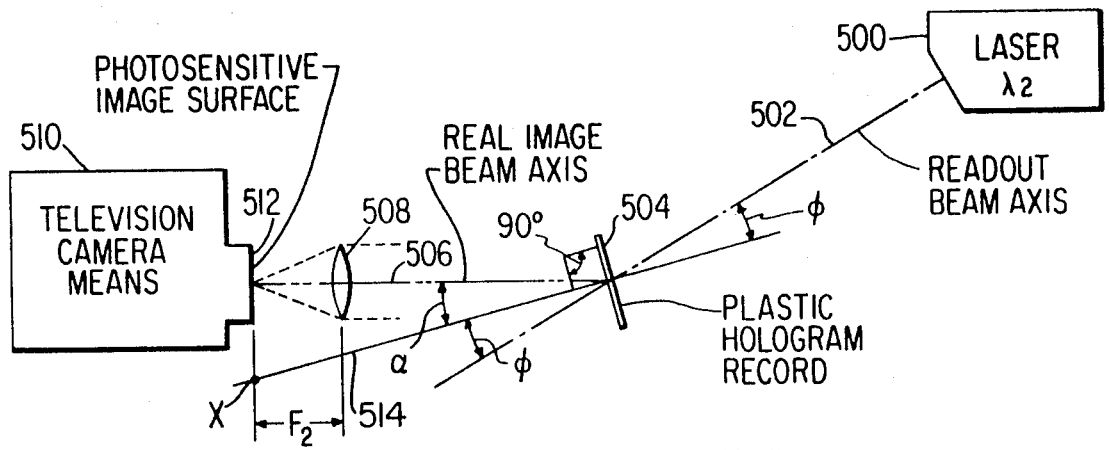
FIG. 5 shows the playback technique employed in an embodiment of the present invention.

Referring now to FIG. 5, there is shown the playback technique of the present invention. The arrangement and orientation of elements 500, 508, 510 and 512 in FIG. 5, correspond in all respects to respective elements 300, 308, 310 and 312 of the prior art playback technique shown in FIG. 3. The essential difference between the playback technique of the present invention and the prior art playback technique, other than the fact that the phase hologram was recorded by a different technique, is in the orientation of plastic hologram record 504 with respect to a readout beam axis 502.

Figure 5A:
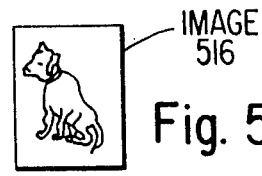
FIG. 5a shows the reconstructed image of the phase hologram being read back along with the distribution of other optical energy in the plane of the reconstituted image.

In accordance with one purpose of the present invention, the angle of incidence $\Phi$ is chosen to provide a first order diffraction angle $\alpha_0$ which is significantly different from zero, not zero as in FIG. 3. Therefore, image beam axis 506 will not be directed along a normal 514 to the surface of plastic hologram record 504. Since the streak of optical energy emerging from plastic hologram record 504 in response to being illuminated by the readout beam, due to the presence of the longitudinal scratches on plastic hologram record 504, is directed along normal 514, which intersects the plane in which photosensitive imaging surface 512 is located at point X, the undesired streak of light will not be superimposed upon the reconstructed real image of the phase hologram, as illustrated by image 516 and streak 518 in FIG. 5a. Therefore, the scratch problem, discussed above is solved.

Another and separate purpose of the playback technique of FIG. 5 is to solve the problem of twist in the plastic hologram record tape.

Figure 3B:
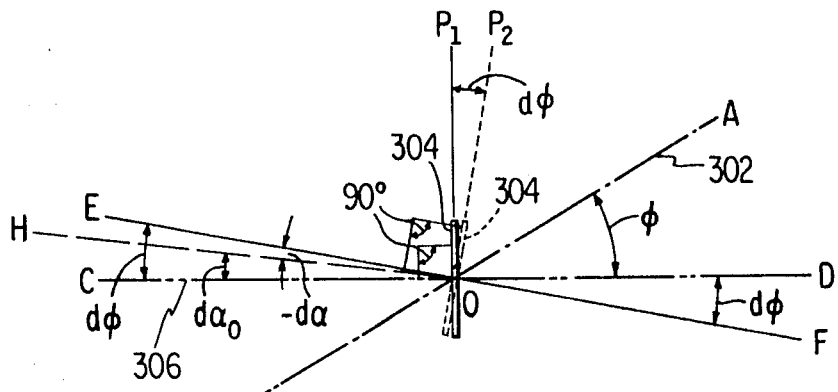
FIG. 3b is a diagram helpful in explaining the effect of twist or rotation of the plastic hologram record in the prior art playback technique of FIG. 3.
Figure 3A:
FIG. 3a is an illustration of a typical image reconstructed by the prior art playback technique of FIG. 3.
Figure 5B:
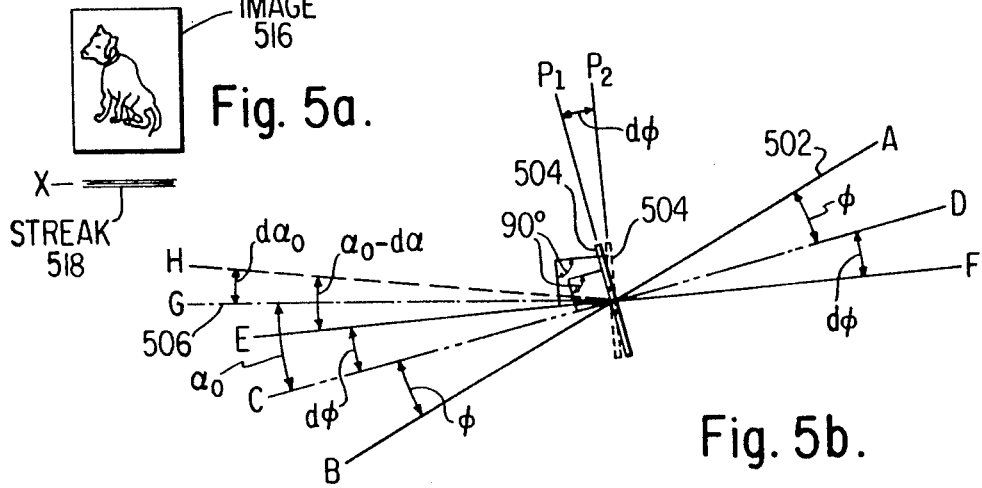
FIG. 5b is a diagram useful in explaining the effect of twist or rotation of the plastic hologram record of FIG. 5.

FIG. 5b, which is analogous to FIG. 3b, shows the effect of twist of plastic hologram record 504 from its nominal position $P_1$. All designations in FIG. 5b are identical to those used in FIG. 3b, except that since $\alpha_0$ is no longer zero, the direction of real image beam 506 when plastic hologram record 504 is in its nominal position $P_1$ is designated by the line segment O–G, which, of course, is no longer coincident with the line segment C–D, the normal to plastic hologram record 504 when in its nominal position $P_1$.

The following relationship holds for Fraunhofer diffraction and is approximately valid from Fresnel diffraction for practical applications of reconstructing phase holograms of the type disclosed in the aforesaid copending application Ser. No. 509,100, wherein motion pictures are recorded in hologram form and played back over television camera means:

(1) $\sin \Phi + \sin \alpha = (\lambda_2/\lambda_1)\sin\theta$

Further, it will be seen from both FIGS. 3b and 5b that the following relationship holds among the incremental variables $d\alpha_0$ q $d\alpha$ and $d\theta$:

(2) $d\alpha_0 = d\theta + d\alpha$

By differentiating equation 1, substituting $d\alpha_0$ for $d\alpha$ in differentiated equation (1) in accordance with equation (2), and then letting differentiated equation (1), after such substitution, equal zero, the particular value of $\Phi$ which results in a minimum change in $d\alpha_0$ for a given change in $d\Phi$ can be determined. This unique value of $\Phi$, which results a minimum change in $\alpha_0$, for a given change in $d\Phi$ turns out to be given by the following relationship:

(3) $\Phi = \theta = \arc \sin \lambda_2 \sin \theta, \lambda_1$ 2

More descriptively, it can be seen from equation (1) that, all other things being equal, the angle of first order diffraction $\alpha$ becomes smaller as the angle of incidence $\Phi$ becomes larger. By employing that unique value angle of incidence at which the change in the value thereof in equation (1) is offset by an exactly equal and opposite change in the first order of diffraction angle $\alpha$ will result in the minimum change in image beam axis 506 for the given change in the angle of incidence due to twisting of plastic hologram record 504.

Although in the preferred embodiment disclosed herein, both avoidance of a streak in the reconstructed image due to longitudinal scratching and optimum angle of incidence $\Phi$ to obtain minimum change in the image due to twisting are achieved, either of these features of the present invention may be independently achieved without the other one.

What is claimed is:

1. In apparatus, including means having a photosensitive surface, for playing back a longitudinal series of phase holograms pressed on a transparent medium by illuminating the surface of each of said holograms in sequence with a readout beam of optical energy of given wavelength which impinges upon the then illuminated hologram surface at that chosen given angle of incidence with respect to said hologram surface which results in a reconstructed image of said hologram being positioned in a fixed area of said photosensitive surface when said hologram surface has a predetermined orientation with respect thereto, and wherein said medium is subject to a type of motion with respect to said predetermined orientation which results in the angle of incidence of said readout beam impinging on said phase hologram varying from said chosen given angle causing the position of said reconstructed image being moved from said fixed area; the improvement comprising means for orienting said readout beam, said surface of said phase hologram and said photosensitive surface with respect to each other to provide that unique value for said chosen given angle which results in a minimum movement of said reconstructed image with respect to any given variation in said angle of incidence due to said type of motion of said medium with respect to said predetermined orientation, said unique value being that which provides an amount of incremental change in the angle of first order diffraction of said readout beam with respect to said phase hologram surface in response to an incremental change in the angle of incidence of said readout beam with respect to said phase hologram surface which is substantially equal and opposite to the amount of said last-mentioned incremental change.

2. Apparatus defined in claim 1, wherein said medium comprises a flexible length of tape to be moved in the longitudinal direction of said tape, and said type of motion is unwanted twisting motion of said tape in a direction orthogonal to said length thereof.

3. Apparatus defined in claim 1, wherein said phase hologram is such as to produce an oblique angle of first order diffraction with respect to the surface of said phase hologram when said medium has said predetermined orientation and said chosen given angle of incidence has said unique value.

4. Apparatus defined in claim 3, wherein said medium includes a length of tape of relatively soft material subject to scratching particularly in a direction parallel to the length thereof, whereby diffraction of said readout beam by longitudinal scratches causes a streak of optical energy to be directed substantially orthogonal to the surface of said hologram in response to said hologram being illuminated by said readout beam, said streak intersecting the plane in which said photosensitive surface and said reconstructed image are situated in an area which is at all times entirely outside of the area of said reconstructed image.

5. The apparatus defined in claim 1, wherein said phase hologram defines the interference pattern formed by a reference beam of spatially coherent optical energy of a second given wavelength substantially disposed about a first axis and an object information beam of said spatially coherent optical energy substantially disposed about a second axis, where said second axis is angularly displaced from said first axis by a given displacement angle, and wherein the sine of said given angle incidence is substantially equal to one-half the ratio of said first-mention given wavelength to said second given wavelength multiplied by the sine of said given displacement angle.

6. The apparatus defined in claim 5, wherein in the formation of said interference pattern the respective orientations of said first and second axes with respect to the surface of said hologram is such that the bisector of said displacement angle is substantially perpendicular to said surface of said hologram.

7. The apparatus defined in claim 5, wherein said first-mentioned and said second wavelengths are the same.

8. The apparatus defined in claim 5, wherein said first-mentioned and said second wavelengths are different from each other.

9. The apparatus defined in claim 8, wherein said second wavelength is longer than said first-mentioned wavelength.

10. In apparatus, including means having a photosensitive surface, for playing back a longitudinal series of phase holograms pressed on a length of tape adapted to be moved in a longitudinal direction, said tape being composed of a relatively soft material subject to scratching particularly in a direction parallel to the length thereof, each of said phase holograms being played back in sequence with a readout beam of optical energy of given wavelength which impinges upon the hologram surface then being played back at that chosen given angle of incidence with respect to said hologram surface which results in a reconstructed image of said hologram being positioned in a fixed area of said photosensitive surface when said hologram surface has a predetermined orientation with respect thereto, whereby diffraction of said readout beam by longitudinal scratches causes a streak of optical energy to be directed substantially orthogonal to the surface of said hologram in response to said hologram being illuminated by said readout beam; the improvement wherein said phase hologram is such as to produce an oblique angle of first order diffraction with respect to the surface of said phase hologram when said medium has said predetermined orientation and said readout beam has said given chosen angle of incidence with respect thereto, whereby said streak intersects the plane in which said photosensitive surface and said reconstructed image are situated in an area which is entirely outside of said fixed area of said reconstructed image.

11. Apparatus defined in claim 10, wherein said phase hologram defines the interference pattern formed by a reference beam of spatially coherent optical energy of a second given wavelength disposed about a first axis and an object information beam of said spatially coherent optical energy substantially disposed about a second axis, where said second axis is angularly displaced from said first axis by a given displacement angle and said first and second axes are oriented with respect to the surface of said hologram so that the bisector of said displacement angle is substantially perpendicular to said surface of said hologram.

* * * * *